(12) United States Patent
Jakkula et al.

(10) Patent No.: US 10,680,731 B2
(45) Date of Patent: Jun. 9, 2020

(54) METHODS AND APPARATUS TO FACILITATE LOCAL TIME-BASED DIGITAL AUDIO MEASUREMENT

(71) Applicant: The Nielsen Company (US), LLC, New York, NY (US)

(72) Inventors: Gangadhar Jakkula, Tampa, FL (US); Narasimha Reddy Goli, Tampa, FL (US); Kevin K. Gaynor, Sunnyvale, CA (US)

(73) Assignee: The Nielsen Company (US), LLC, New York, NY (US)

(*) Notice: Subject to any disclaimer, the term of this patent is extended or adjusted under 35 U.S.C. 154(b) by 423 days.

(21) Appl. No.: 15/230,021

(22) Filed: Aug. 5, 2016

(65) Prior Publication Data
US 2017/0070304 A1    Mar. 9, 2017

(30) Foreign Application Priority Data
Sep. 5, 2015   (IN) ............................ 4710/CHE/2015

(51) Int. Cl.
| G06F 15/173 | (2006.01) |
| H04H 60/33 | (2008.01) |
| H04L 29/08 | (2006.01) |
| H04H 60/51 | (2008.01) |
| H04L 12/26 | (2006.01) |

(52) U.S. Cl.
CPC ............ H04H 60/33 (2013.01); H04H 60/51 (2013.01); H04L 67/34 (2013.01); H04L 43/10 (2013.01); H04L 43/106 (2013.01)

(58) Field of Classification Search
CPC ........ H04H 60/33; H04H 60/51; H04L 43/10; H04L 43/106; H04L 67/34
See application file for complete search history.

(56) References Cited

U.S. PATENT DOCUMENTS

| 6,012,088 A * | 1/2000 | Li ....................... G06F 9/44505 |
| | | 709/219 |
| 6,226,098 B1 * | 5/2001 | Kulakowski ........... H04H 60/65 |
| | | 348/473 |
| 7,058,720 B1 * | 6/2006 | Majidimehr ...... H04L 29/06027 |
| | | 709/217 |
| 7,471,987 B2 | 12/2008 | Crystal et al. |
| 7,500,607 B2 * | 3/2009 | Williams ............... G06Q 20/20 |
| | | 235/379 |
| 7,869,762 B2 | 1/2011 | Lai |
| 8,116,783 B2 | 2/2012 | Duxbury et al. |
| 8,332,402 B2 | 12/2012 | Forstall et al. |
| 9,107,038 B1 | 8/2015 | Marupaduga et al. |
| 9,338,289 B1 * | 5/2016 | Goyal ............... H04M 3/42059 |

(Continued)

Primary Examiner — Chris Parry
Assistant Examiner — Dixon F Dabipi
(74) Attorney, Agent, or Firm — Hanley, Flight & Zimmerman, LLC

(57) ABSTRACT

Example methods, apparatus, systems and articles of manufacture to facilitate local time-based digital audio measurement are disclosed. Example methods disclosed herein include a hello ping may be received from a media player. The media player may be associated with a location based on the hello ping. The media player may be associated with a time offset based on the location. A configuration file may be generated to include the location and the time offset. The configuration file may be sent to the media player.

33 Claims, 13 Drawing Sheets

(56) References Cited

U.S. PATENT DOCUMENTS

| | | | |
|---|---|---|---|
| 2003/0137453 A1* | 7/2003 | Hannah | G01S 1/24 |
| | | | 342/387 |
| 2003/0181196 A1* | 9/2003 | Davidov | G06F 8/30 |
| | | | 455/414.1 |
| 2006/0067227 A1* | 3/2006 | Batni | H04L 41/00 |
| | | | 370/235 |
| 2006/0195838 A1* | 8/2006 | Epstein | G06F 21/10 |
| | | | 717/174 |
| 2008/0098417 A1* | 4/2008 | Hatamian | H04H 60/33 |
| | | | 725/24 |
| 2013/0291000 A1* | 10/2013 | Wright | H04N 21/845 |
| | | | 725/19 |
| 2014/0324545 A1 | 10/2014 | Splaine et al. | |
| 2014/0342725 A1* | 11/2014 | Taylor | H04W 4/029 |
| | | | 455/419 |

* cited by examiner

| Local Timestamp | Daypart Identification | Daypart Group | Daypart Label | Week Identification | Reporting Period Identification |
|---|---|---|---|---|---|
| 05/18/2015 05:23:47 | daypartID1 | Weekly Dayparts | Monday-Friday 5AM-10AM | WeekID1 | RP6 |
| 06/23/2015 07:01:32 | daypartID2 | Weekly Dayparts | Monday-Friday 6AM-10AM | WeekID2 | RP7 |
| 07/29/2015 09:15:24 | daypartID3 | Weekly Dayparts | Monday-Saturday 6AM-10AM | WeekID3 | RP8 |
| 09/02/2015 14:16:18 | daypartID4 | Weekly Dayparts | Monday-Friday 6AM-3PM | WeekID4 | RP9 |
| 09/08/2015 18:54:12 | daypartID5 | Weekly Dayparts | Monday-Friday 6AM-7PM | WeekID1 | RP10 |
| 10/12/2015 22:22:22 | daypartID6 | Weekly Dayparts | Monday-Friday 6AM-12AM | WeekID2 | RP11 |
| 11/17/2015 10:15:19 | daypartID7 | Weekly Dayparts | Monday-Sunday 6AM-12AM | WeekID3 | RP12 |
| 12/21/2015 12:18:10 | daypartID8 | Weekly Dayparts | Monday-Sunday 6AM-6AM | WeekID4 | RP13 |

| INTERNET PROTOCOL ADDRESS | GLOBAL POSITIONING COORDINATES (Latitude, Longitude) | POSTAL CODE | FIRST METRO | SECOND METRO |
|---|---|---|---|---|
| 062.32.014.2 | (41.886175, -87.639223) | 60606 | CHICAGO | LOOP |
| 122.62.015.3 | (41.877516, -87.634288) | 60606 | CHICAGO | LOOP |
| 867.53.098.1 | (41.718182, -87.668209) | 60643 | CHICAGO | SOUTHSIDE |
| 100.82.010.3 | (41.502201, -73.965147) | 12508 | GREATER NEW YORK CITY | HUDSON VALLEY |
| 111.72.012.1 | (21.276580, -157.828823) | 96815 | HAWAII | |
| 071.51.981.1 | (37.445526, -122.148491) | 94301 | SAN FRANCISCO | SAN JOSE |

FIG. 3

METHODS AND APPARATUS TO FACILITATE LOCAL TIME-BASED DIGITAL AUDIO MEASUREMENT

FIELD OF THE DISCLOSURE

This disclosure relates generally to media crediting and, more particularly, to methods and apparatus to facilitate local time-based digital audio measurement.

BACKGROUND

In recent years, audio media is sometimes measured according to when the audio media is consumed. In some cases, determining the local time of when the audio media is consumed is useful when measuring the audio media.

BRIEF DESCRIPTION OF THE DRAWINGS

FIG. 1 is a table of example dayparts that may be used to perform local time-based digital audio measurements.

FIG. 3 is a table illustrating example location identifiers and corresponding example metro data.

The figures are not to scale. Wherever possible, the same reference numbers will be used throughout the drawing(s) and accompanying written description to refer to the same or like parts.

DETAILED DESCRIPTION

Figure 2:
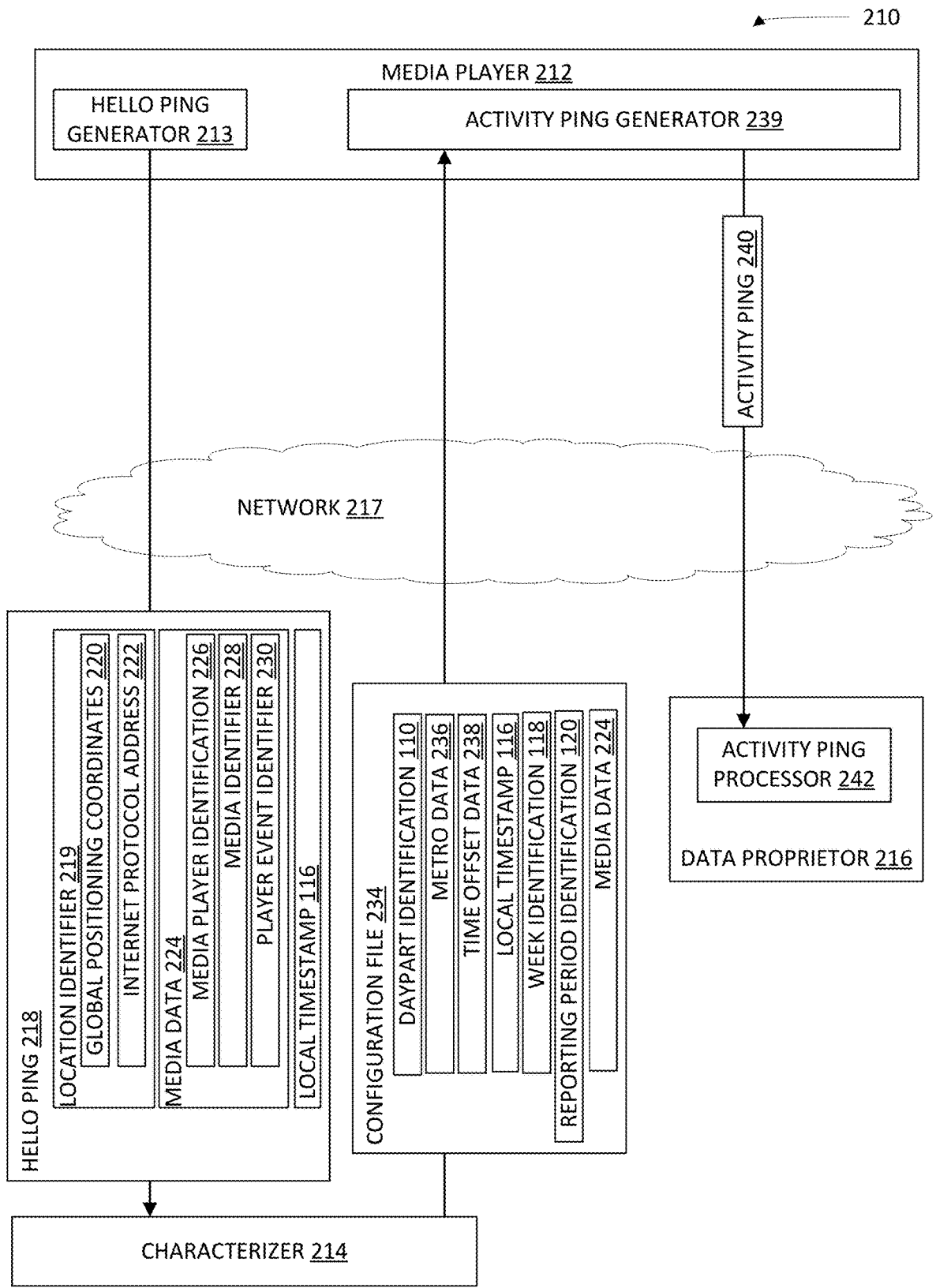
FIG. 2 is a block diagram of an example system in accordance with the teaching of this disclosure.

Audience measurement entities (AME) desire knowledge on how users interact with media devices such as smartphones, tablets, laptops, smart televisions, etc. In particular, audience measurement entities want to monitor media presentations made at the media devices to, among other things, monitor exposure to advertisements, determine advertisement effectiveness, determine user behavior, identify purchasing behavior associated with various demographics, etc.

In census-based digital audio measurement techniques, audience measurement entities may insert (or embed) an exposure monitor in a media player associated with a digital audio media provider via, for example, a software development kit. In some such examples, when an online user, for example, a digital audio media consumer, accesses the media player (e.g., visits a digital audio media provider website, etc.), the exposure monitor generates an activity ping that is communicated to a data proprietor, such as Facebook®, Yahoo®, Google®, etc. In some such examples, the activity ping may include a cookie obtained from the media player (e.g., which may be a web browser, a media player application, etc.). The data proprietor may then attribute an impression to a user account corresponding to the cookie and aggregate the impressions and audience information based on demographics associated with the user account. Activity pings may also include additional information, such as a media player identifier, a media identifier, a timestamp, etc.

An audience measurement entity may then generate digital audio media reports based on the audience information provided by the data proprietors and the activity ping. The digital audio media reports may be used by media providers to determine, for example, effectiveness of their marketing, how much to charge for streaming ads, etc. One example measurement that may be useful to media providers is the reach and/or number of unique audience members exposed to their media during predetermined periods of local time, referred to as local dayparts, which will be described in further detail below in conjunction with FIG. 1.

Methods and apparatus disclosed herein facilitate local time-based digital audio measurement. Example methods disclosed herein include receiving a hello ping from a media player, associating the media player with a location based on the hello ping, associating the media player with a time offset based on the location, generating a configuration file including the location and the time offset, and sending the configuration file to the media player.

Example apparatus disclosed herein include a communication interface, a location associator, a time offsetter, and a configuration file generator. In some disclosed examples, the communication interface receives a hello ping from a media player sends a configuration file to the media player. In some disclosed examples, the location associator associates the media player with a location based on the hello ping. In some disclosed examples, the time offsetter associates the media player with a time offset based on the location. In some disclosed examples, the configuration file generator generates the configuration file based on the location and the time offset.

In some disclosed examples, digital audio media is measured with respect to a predetermined period of time, which may be referred to as a daypart. In some examples, dayparts may be defined to cover activities during which users may consume digital audio media, such as, but not limited to, a morning commute, an evening commute, a lunchbreak, and/or the like. Additionally or alternatively, in some examples, dayparts may be defined to include various combinations of days of the week, such as, but not limited to, a Monday through Friday workweek, a Saturday through Sunday weekend, an entire Sunday through Saturday week, and/or the like. Additionally or alternatively, in some examples, dayparts may be defined to include predetermined blocks of time within a day. As shown in the example of FIG. 1, a daypart may be assigned an example daypart identification 110, may be part of an example daypart group 112, and may be assigned an example daypart label 114. The daypart label 114 may be descriptive of the predetermined time period a particular daypart covers, such as, but not limited to, early morning, breakfasttime, morning commute, morning rush hour, morning, late morning, midday, lunchtime, early afternoon, afternoon, late afternoon, evening, early evening, evening commute, evening rush hour, dinnertime, late evening, twilight, night, late night, graveyard shift, first shift, second shift, third shift, dawn, dusk, and/or the like.

In some examples, dayparts may be formatted using a local timestamp 116 of a time that is local to the user who is consuming digital audio media. It should be understood that the term "local time" refers to time designations based on divisions of a 24-hour day used at a particular longitude on earth where 12:00 PM, 1200 hours, noon occurs when the sun is approximately at its highest point in the sky as viewed from that particular longitude and 12:00 AM, 0000 hours, midnight occurs when that particular longitude is approximately fully turned away from the sun as the earth rotates about its axis. In other words, it should be understood that the term "local time" refers to the customary time used in a particular time zone. Refocusing on FIG. 1, the daypart with a daypart identification 110 "daypartID1," for example, may cover a period from 5:00 AM to 10:00 AM each day of Monday through Friday, inclusive. In other words, dayparts may be a convenient way to describe portions of days that may be of particular interest. Rephrased, dayparts may be a useful shorthand to describe predetermined periods of a day. In addition to dayparts 110 and local timestamps 116, local time may be further described with a week identification 118 and/or a reporting period identification 120. In some examples the week identification 118 may cover seven days beginning and ending at a particular local time on a particular day of week (e.g., beginning and ending on Thursdays at 5:00 AM). In some examples, the reporting period identification 120 may cover 28 days (e.g., four seven-day weeks) and may thus be associated with four week identifications 118. Thus, a customary 365 day, 52 week year may be divided and described with thirteen reporting periods 120 of four weeks, which may be described with week identifications 118. For example, as illustrated in FIG. 1, a local time of 12:18:10 on Dec. 21, 2015 may be formatted as local timestamp 116 "12/21/2015 12:18:10," may be described with daypart identification 110 "daypartID8," which belongs to daypart group 112 "Weekly Dayparts" and has a daypart label 114 "Monday-Sunday 6 AM-6 AM," and may be further described with week identification 118 "WeekID4," of reporting period identification 120 "RP13" (e.g., the fourth week of the thirteenth reporting period). However, because dayparts may be specified relative to the digital audio media consumer's local time, additional time zone offset data may be to needed to analyze digital audio media measured during a daypart on a global scale. For example, because digital audio media reports sent by media players may have a timestamp that records a particular local time with respect to the media player, but may lack data related to where the report was made and the respective time zone, additional respective local temporal information may be required to relate reports made by media players located in different parts of the world. For example, during data processing and analysis, without local time zone data, a digital audio media report made in Berlin at 5:00 PM may be confused as occurring simultaneously with another digital audio media report made in Chicago at 5:00 PM, although Berlin is seven hours ahead of Chicago. Disclosed example structures and methods to add time zone data to local time digital audio media reports are further described in FIGS. 2-7 below.

Focusing now on FIG. 2, an example system 210 disclosed herein for adding time zone data and location data to digital audio media reports includes an example media player 212, an example characterizer 214, and an example data proprietor 216. The media player 212 is connected to the characterizer 214 and to the data proprietor 216 via an example network 217. The media player 212 may be any type of networkable media playback device including, but not limited to, a mobile telephone, an mp3 player, an internet-connected radio, a wifi-enabled radio, a Bluetooth-enabled radio, a set-top box, and/or the like. The characterizer 214 and the data proprietor 216 may be any type of networkable computing device including, but not limited to, a personal computer, a server, a laptop, a notebook computer, and/or the like.

The media player 212 of the illustrated example includes an example hello ping generator 213. The hello ping generator 213 generates and sends an initial digital audio media report, referred to as a hello ping 218 to the characterizer 214 via the network 217. The example hello ping 218 includes digital audio media reporting data such as, but not limited to, a location identifier 219, and/or the like. The location identifier 219 may be any type of geographic designator such as, but not limited to, global positioning coordinates 220, an internet protocol address 222, and/or the like. The media player may further generate audio media data 224, which may include data such as, but not limited to, a media player identifier 226, a media identifier 228, a player event identifier 230 and/or the like. In some examples, the media player identifier 226 identifies the media player's 212 make, model, serial number, and/or the like. In some examples, the media identifier 228 identifies a song title, an artist, a musical genre, a broadcast type, a program title, and/or the like. In some examples, the player event identifier 230 identifies commands from the media player 212 such as, but not limited to, a play command, a pause command, a skip command, a stop command, and/or the like. In the illustrated example, the media data 224 (shown in phantom) is included in the hello ping 218. In some examples, the hello ping 218 further includes the local timestamp 116 corresponding to when the media player sends the hello ping 218 to the characterizer 214. In some examples, the media data 224 and the local timestamp 116 may be omitted from the hello ping 218. In some such examples, the hello ping 218 may not be generated by the hello ping generator 213 of the media player 212 to have the media data 224 or the local timestamp 116. Thus, in some such examples, the characterizer 214 generates the local timestamp 116 when the characterizer 214 receives the hello ping 218 via the network 217 from the hello ping generator 213 of the media player 212.

The characterizer 214 generates an example configuration file 234 using the hello ping 218. In some examples, the configuration file 234 includes the local timestamp 116, the week identification 118 and the reporting period identification 120 corresponding to the local timestamp 116, plus metro data 236 and time offset data 238. In some examples, the configuration file 234 further includes the media data 224 (shown in phantom). For example, the characterizer 214 of FIG. 5 adds the corresponding week identification 118, reporting period identification 120, metro data 236, and time offset data 236 to the local timestamp 116 and the media data 224 to produce the configuration file 234. The characterizer 214 may store and correlate the week identifications 118 and the reporting periods 120 with the local timestamp 116. Metro data 236 and time offset data 238 will be described in further detail below in conjunction with FIGS. 3-4. The characterizer 214 then sends the configuration file 234 to the media player 212 via the network 217.

The media player 212 further includes an example activity ping generator 239 which receives the configuration file 234 from the characterizer 214. In some examples, upon receiving the configuration file 234, activity ping generator 239 included in the media player 212 uses the configuration file 234 to produce a completed digital audio media report, also referred to as an activity ping 240. In some examples, the activity ping 240 includes the media data 224, the local timestamp 116, the metro data 236, and the time offset data 238, the daypart identification 110, the week identification 118, and the reporting period identification 120.

In some examples, in which the hello ping 218 and, therefore, the configuration file 234 includes the media data 224, the activity ping generator 239 may use the configuration file 234 as the activity ping 240. Thus, in some examples, the configuration file 234 is the activity ping 240. In some examples, the activity ping generator 239 may append the configuration file 234 to the audio media data 224 to produce the activity ping 240. For example, the activity ping generator 239 may combine media data 224 stored by the media player 212 with the configuration file 234 to create the activity ping 240.

In some examples, the configuration file 234 provides a template identifying the media data 224 to be included by the activity ping generator 239 in the activity ping 240. In some such examples, when generating the activity ping 240, the activity ping generator 239 may process the configuration file 234 by filling the configuration file 234 with the appropriate media data 224. In some examples, the configuration file 234 includes instructions to be executed by the activity ping generator 239 to populate fields in the configuration file 234 with the media data 224 to generate the resultant activity ping 240. Further, in the illustrated example, the activity ping generator 239 of the media player 212 sends the activity ping 240 to the data proprietor 216 via the network 217.

The data proprietor 216 includes an example activity ping processor 242 which receives the activity ping 240 from the activity ping generator 239 via the network 217. In some examples, upon receiving the activity ping 240, the activity ping processor 242 included in the data proprietor 216 analyzes the activity ping 240 to produce a report of the media player 212 user's habits and preferences based on the media data 224, the local timestamp 116, the metro data 236, and the time offset data 238 included in the activity ping 240. Further, the activity ping processor 242 of the illustrated example can aggregate multiple activity pings 240 from different geographic locations (e.g., around the world) to produce a time adjusted, respective, and comparative report of multiple media player 212 users' habits and preferences. Examples of metro data 236 and time offset data 238 used by the activity ping processor 242, as well as example structures and methods to produce the metro data 236 and the time offset data 238, are further explained by FIGS. 3-7 below.

FIG. 3 illustrates an example location database 308 that may be used by the example characterizer 214 to correlate metro data 238 and location identifiers 219. In some examples, the metro data 238 is further correlated to the global positioning coordinates 220. In some examples, the metro data 238 is additionally or alternatively correlated to the internet protocol addresses 222.

In the illustrated example, the metro data 238 includes a postal code 310, a first metro identifier 312, and a second metro identifier 314. It should be understood that metro data 238 may include any number of additional metro identifiers, postal codes, area codes, or other geographical divisions. In some examples, the postal codes 310 are US ZIP codes. In some examples, the first and second metro identifiers 312, 314 are associated with geographical regions. In some examples, the second metro identifiers 314 may be a subpart of the respective first metro identifiers 312 (e.g., second metro identifiers 314 may be a more precise location designation within respective first identifiers 312). For example, as shown in FIG. 3, the second metro identifier 214 "Loop" is a subpart of the first metro identifier 312 "Chicago," as the Loop is a neighborhood of and contained in the city of Chicago. Similarly, the second metro identifier 314 "Hudson Valley" is a subpart of first metro identifier 312 "Greater New York City," as the Hudson Valley is a region in the geographical area surrounding New York City. In some examples, a portion of the second metro identifier 314 may overlap with the first metro identifier 312 (e.g., the first metro identifier 312 and the second metro identifier 314 may neighbor one another and may both cover a particular location). For example, as shown in FIG. 3, the second metro identifier 214 "San Jose" and the first metro identifier 312 "San Francisco" are associated with postal code 310 "94301" as the postal code 310 "94301" denotes Palo Alto, a city located approximately midway between San Francisco and San Jose. However, in some examples, the first metro identifier 312 may not be associated with a corresponding second metro identifier 314. For example, first metro identifier 312 "Hawaii" is not associated with a more precise and/or does not overlap with a second metro identifier 314.

In some examples, the characterizer 214 of FIG. 2 associates the location identifiers 219 carried by the hello ping 218 with the respective postal code 310. In some such examples, the characterizer 214 may associate the global positioning coordinates 220 with the respective postal codes 310. For example, the global positioning coordinates 220 may include latitude and longitude data which can be correlated by the characterizer 214 to a latitude 316 and a longitude 318 mapped in the location database 308 to a postal code 310 and/or the metro identifiers 312, 314. In some examples, the characterizer 214 additionally or alternatively associates the internet protocol address 222 with the respective postal code 310. Further, in some examples, the characterizer 214 may associate the postal code 310 with the respective first and second metro identifiers 312, 314. In some examples, the associations between the location identifiers 219, the postal codes 310, and the first and second metro identifiers 312, 314 are predetermined. Example structures and methods used by the characterizer 214 to make associations between the location identifiers 219, the postal codes 310, and the first and second metro identifiers 312, 314 will be described below in conjunction with FIGS. 5-6.

Figure 4:
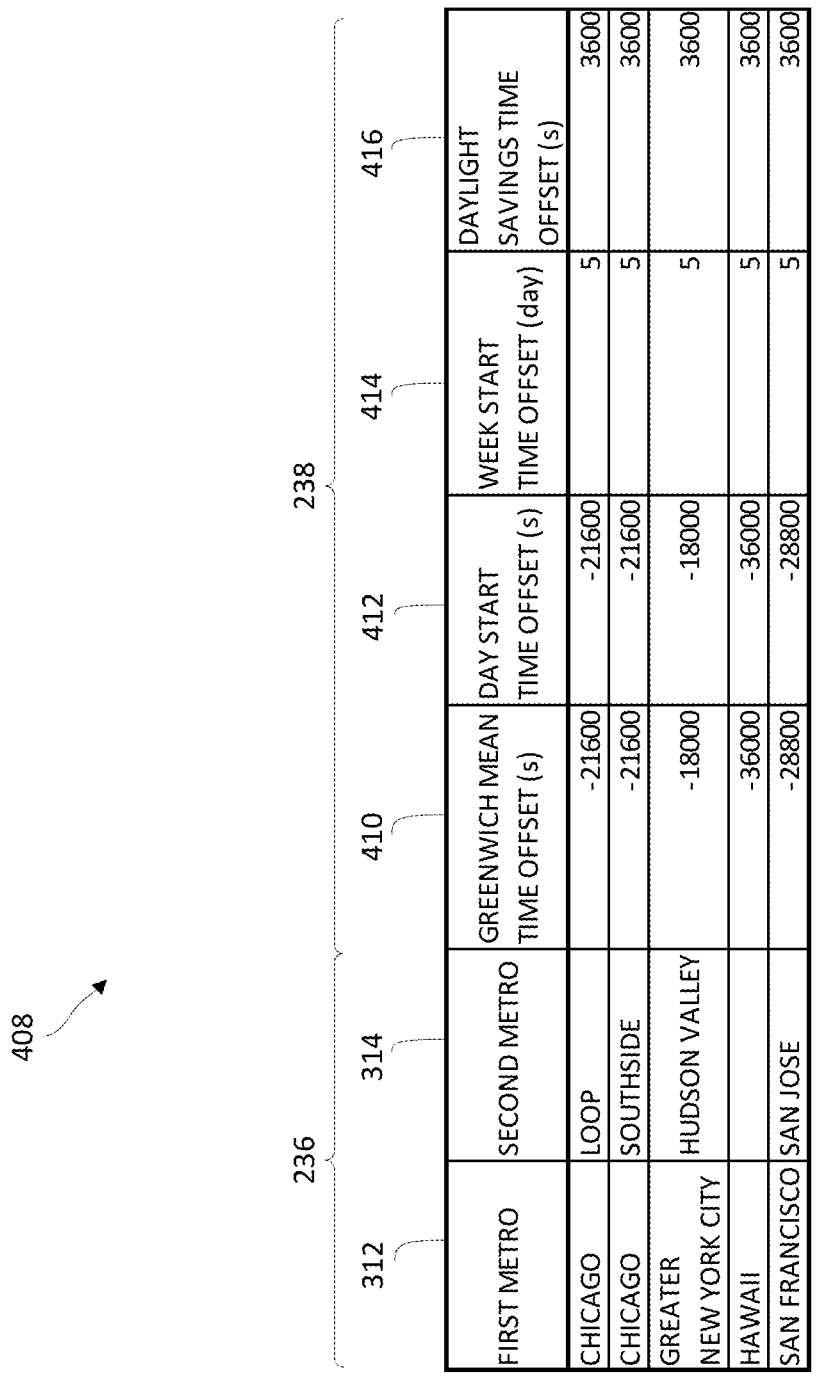
FIG. 4 is a table illustrating example metro data and corresponding example time offset data that may be used by the example system of FIG. 2.

FIG. 4 illustrates an example time database 408 the may be used by the characterizer 214 to correlate the first and second metro identifiers 312, 314 and the time offset data 238. In some examples, time offset data 238 may include a Greenwich Mean Time offset 410, a day start time offset 412, a week start time offset 414, and a daylight savings time offset 416. In some examples, the Greenwich Mean Time offset 410, the day start time offset 412, the week start time offset 414, and the daylight savings time offset 416 are predetermined numerical values. It should be understood that, in some examples, the time offset data 238 may include one or more time-related offsets in addition to, or as an alternative to, the example time offsets illustrated in FIG. 4.

In some examples, as shown in FIG. 4, the Greenwich Mean Time offset 410, the day start time offset 412, and the daylight savings time offset 416 may be measured in seconds. In some examples, as depicted in FIG. 4, the week start time offset 414 may be measured in days. However, one or more of the Greenwich Mean Time offset 410, the day start time offset 412, the week start time offset 414, and the daylight savings time offset 416 may be measured in any other unit of time, or in combination of units of time.

In some examples, the Greenwich Mean Time offset 410 associated with respective first and second metro identifiers 312, 314 may correspond to the time zone of the postal code 310 also associated with the respective first and second metro identifiers 312, 314. For example, postal code 310 "60606" of FIG. 3 is associated with Greenwich Mean Time offset 410 "−21600" via correlation with first metro identifier 312 "Chicago" and with the second metro identifier 314 "Loop." The Greenwich Mean Time offset 410 is "−21600" in this example because 21,600 seconds equals six hours and the postal code 310 "60606" corresponds to US Central Time, which is six hours behind Greenwich Mean Time. In some examples, the Greenwich Mean Time offset 410 associated with respective first and second metro identifiers 312, 314 may be different than the time zone of the postal code 310 also associated with the respective first and second metro identifiers 312, 314. In some such examples, the time offset data 238 may be dependent on the first and second metro identifiers 312, 314, but independent of the postal codes 310. The data proprietor 216 of FIG. 2 uses time offset data 238 to analyze and compare activity pings 218 from different locations around the world. As such, the Greenwich Mean Time offset 410, the day start time offset 412, the week start time offset 414, and the daylight savings time offset 416 may be defined in any way useful to analyzing and comparing the activity pings 218.

In some examples, the characterizer 214 associates the first and second metro identifiers 312, 314 with the respective Greenwich Mean Time offset 410, day start time offset 412, week start time offset 414, and daylight savings time offset 416. In some examples, the associations between first and second metro identifiers 312, 314 and respective time offset data 238 may be predetermined. Example structures and methods used by the characterizer 214 to make associations between the first and second metro identifiers 312, 314 and the time offset data 238 will be described below in conjunction with FIGS. 5-6.

Figure 5:
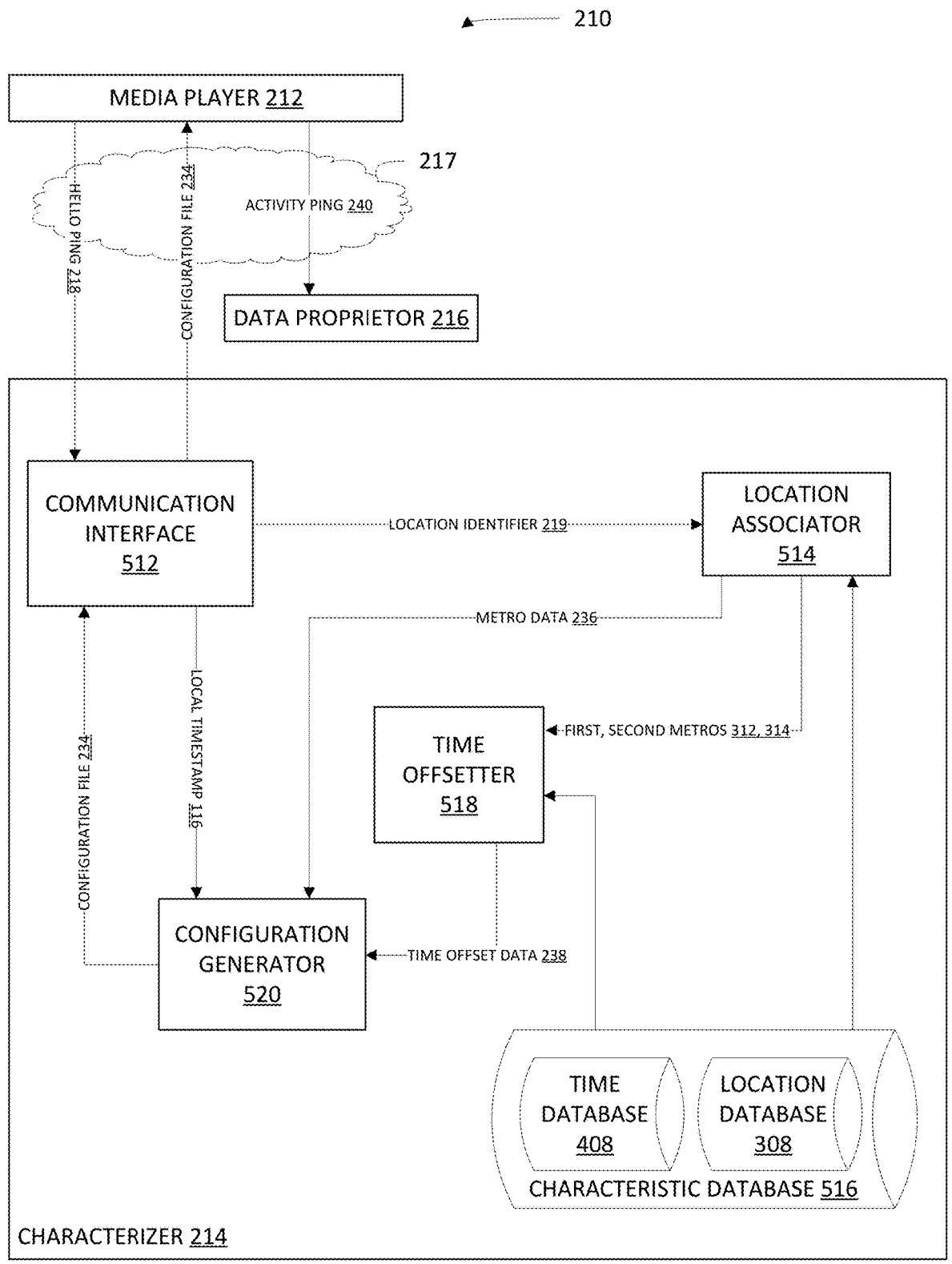
FIG. 5 is a more detailed block diagram of an example characterizer to implement the system of FIG. 2 in accordance with the teachings of this disclosure.

FIG. 5 illustrates an example implementation of the characterizer 214 of the system 210. The example characterizer 214 of FIG. 5 includes an example communication interface 512, an example location associator 514, an example characteristic database 516, an example time offsetter 518, and an example configuration generator 520. The characteristic database 516 of the illustrated example includes the example location database 308 of FIG. 3 and the example time database 408 of FIG. 4. In some examples, the communication interface 512 receives the hello ping 218 from the media player 212. In some further examples, the communication interface 512 generates the local timestamp 116 upon receiving the hello ping 218. In some examples, the communication interface 512 sends the local timestamp 116 to the configuration generator 520. In some examples, the communication interface 512 sends the global positioning coordinates 220 included in the hello ping 218 to the location associator 514. In some examples the communication interface 512 sends the internet protocol address 222 included in the hello ping 218 to the location associator 514.

In some examples, the location associator 514 associates the location identifiers 219 with the metro data 236 by dynamically looking up the location identifiers 219 in the characteristic database 516 and, in particular, the location database 308. In this manner, the media player 212 may be associated with a location described by the metro data 236.

For example, when the location identifiers 219 include global positioning coordinates 220, the location associator 514 can search the location database 408 in the characteristic database 516 to find the postal code 310 that contains the global positioning coordinates 220. Because the first and second metro identifiers 312, 314 are associated with the postal code 310 in the location database 408, the location associator 514 is also able to find and associate the global positioning coordinates 220 with the first and second metro identifiers 312, 314. Said differently, the location associator 514 may search the location database 308 for the postal code 310 that encompasses the global positioning coordinates 220, may find the respective postal code 310 in the location database 308 along with the first and second metro identifiers 312, 314 that belong to the postal code 310, and may retrieve the respective postal code 310 and first and second metro identifiers 312, 314, found to be associated with the global positioning coordinates 220.

As another example, when the location identifiers 219 include internet protocol addresses 222, the location associator 514 can associate the internet protocol address 222 with metro data 236 by dynamically looking up the internet protocol address 222 in the location database 308 in the characteristic database 516. For example, the location associator 514 can search the location database to find the postal code 310 that covers the internet protocol address 222. Because the first and second metro identifiers 312, 314 are associated with the postal code 310 in the location database 308, the location associator 514 is able to identify and associate the first and second metro identifiers 312, 314 with the internet protocol address 222. Said differently, the location associator 514 may examine the location database 308 for the postal code 310 that includes the internet protocol address 222, may pinpoint the respective postal code 310 in the location database 308 along with the first and second metro identifiers 312, 314 that go with the postal code 310, and may fetch the respective postal code 310 and first and second metro identifiers 312, 314.

In some examples, the location associator 514 sends the found postal code 310 and first and second metro identifiers 312, 314, or, more generally, the metro data 236 found to correspond to the location identifiers 219 from the hello ping 218, to the configuration generator 520. Additionally or alternatively, in some examples, the location associator 514 transmits the retrieved first and second metro identifiers 312, 314 to the time offsetter 518. In this manner, the location associator 514 reports the location of the media player 212 to the configuration generator 520 and/or the time offsetter 518.

In some examples, the time offsetter 518 associates the first and second metro identifiers 312, 314, which were found by the location associator 514 as corresponding to the location of the media player 212, with time offset data 238 by dynamically looking up the first and second metro identifiers 312, 314 in the time database 408 of the characteristic database 516. Thus, the media player 212 may be associated with one or more of the time offsets 410, 412, 414, 416. For example, the time offsetter 518 may search the time database 408 for the first and second metro identifiers 312, 314, may locate the first and second metro identifiers 312, 314, and find the time offset data 238 (e.g., the time offsets 410, 412, 414, and/or 416) linked with the first and second metro identifiers 312, 314. Thus, in some examples, the time offsetter 518 scans the time database 408 for the first and second metro identifiers 312, 314 provided by the location associator 514 for the media player 212 to get the time offset data 238 for the media player 212, the time offset data 238 being mapped in advance to the first and second metro identifiers 312, 314. The time offsetter 238 then retrieves the found time offset data 238. In some examples, the time offsetter 238 sends the time offset data 238 retrieved for the media player 212 to the configuration generator 520.

In some examples, the configuration generator 520 receives metro data 236 from the location associator 514, time offset data 238 from the time offsetter 518, and the local timestamp 116 from the communication interface 512. In some examples, the configuration generator 520 generates the daypart identification 110, the week identification 118, and the reporting period identification 120 corresponding to the local timestamp 116. In some such examples, the configuration generator 520 combines the daypart identification 110, the local time stamp 116, the week identification 118, the reporting period identification 120, the metro data 236, and the time offset data 238 to produce the configuration file 234. In some examples, in which the hello ping 218 includes the media data 224, the configuration generator 520 combines the daypart identification 110, the local timestamp 116, the week identification 118, the reporting period identification 120, the metro data 236, the time offset data 238, and the media data 224 to make the configuration file 234. In other words, the configuration generator 520 may compile the time offset data 238, the metro data 236, the daypart identification 110, the local timestamp 116, the week identification 118, the reporting period identification 120 (and, depending on the contents of the hello ping 218, in some examples, the media data 224) to generate the resultant configuration file 234. In some examples, the configuration generator 520 then sends the configuration file 234 to the communication interface 512.

In some examples, the communication interface 512 after receiving the configuration file 234 from the configuration generator 520, the communication interface 512 then sends the configuration file 234 to the media player 212.

From the foregoing, it will be understood and appreciated that the characterizer 214 may receive the hello ping 218 as input from the media player 212 and output the configuration file 234 to the media player 212 based on the hello ping 218. Further, the characterizer 214 may assemble information that characterizes the local timestamp 116 associated with the hello ping 218, such as the daypart identification 110, the week identification 118, the reporting period identification 120, the metro data 236 and/or the time offset data 238, and combine that characterizing information with the local timestamp 116 and, in some examples, the media data 224 to produce the configuration file 234 for the media player 212. As such, it will be understood and appreciated that the produced configuration file 234 may, therefore, record the location of the media player 212 at a particular local time along with information relating the local time of the media player 212 to other local time(s) in different locale(s), such as other time zone(s). By generating the configuration file 234 with the characterizer 214, the media player 212 may be associated with a location and a time offset. By generating and sending the activity ping 240 with the media player 212, the location and time offset associated with the media player 212 may be transmitted to the data proprietor. By processing the activity ping 240 with the data proprietor, a time-normalized report of the habits and preferences of the user of the media player 212 may be produced based on the location and the time offset. Example methods to implement the system 210 as shown in FIGS. 2 and 5 are more fully described in FIG. 6 and below.

While an example manner of implementing the system 210 of FIG. 2 is illustrated in FIGS. 3-5, one or more of the elements, processes and/or devices illustrated in FIGS. 3-5 may be combined, divided, re-arranged, omitted, eliminated and/or implemented in any other way. Further, the example hello ping generator 213, the example network 217, the example activity ping generator 239, the example activity ping processor 242, the example location database 308, the example time database 408, the example communication interface 512, the example location associator 514, the example characteristic database 516, the example time offsetter 518, the example configuration generator 520, and/or, more generally, the example media player 212, the example characterizer 214, and the example data proprietor 216 of FIGS. 2 and 5 may be implemented by hardware, software, firmware and/or any combination of hardware, software and/or firmware. Thus, for example, any of the example hello ping generator 213, the example network 217, the example activity ping generator 239, the example activity ping processor 242, the example location database 308, the example time database 408, the example communication interface 512, the example location associator 514, the example characteristic database 516, the example time offsetter 518, the example configuration generator 520, and/or, more generally, the example media player 212, the example characterizer 214, and the example data proprietor 216 of FIGS. 2 and 5 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, the example media player 212, hello ping generator 213, the example characterizer 214, the example data proprietor 216, the example network 217, the example activity ping generator 239, the example activity ping processor 242 the example location database 308, the example time database 408, the example communication interface 512, the example location associator 514, the example characteristic database 516, the example time offsetter 518, and/or the example configuration generator 520, are hereby expressly defined to include a tangible computer readable storage device or storage disk such as a memory, a digital versatile disk (DVD), a compact disk (CD), a Blu-ray disk, etc. storing the software and/or firmware. Further still, the example characterizer 214 of FIGS. 2 and 5 may include one or more elements, processes and/or devices in addition to, or instead of, those illustrated in FIGS. 2 and 5, and/or may include more than one of any or all of the illustrated elements, processes and devices.

Flowcharts representative of example machine readable instructions for implementing the system 210 of FIGS. 2 and 5 are shown in FIGS. 6-10. In this example, the machine readable instructions comprise a program for execution by a processor such as the processors 1112, 1212, 1312 shown in the example processor platforms 1110, 1210, 1310 discussed below in connection with FIGS. 11-13. The program may be embodied in software stored on a tangible computer readable storage medium such as a CD-ROM, a floppy disk, a hard drive, a digital versatile disk (DVD), a Blu-ray disk, or a memory associated with the processors 1112, 1212, 1312, but the entire program and/or parts thereof could alternatively be executed by a device other than the processors 1112, 1212, 1312 and/or embodied in firmware or dedicated hardware. Further, although the example program is described with reference to the flowchart illustrated in FIGS. 6-10, many other methods of implementing the example system 210 may alternatively be used. For example, the order of execution of the blocks may be changed, and/or some of the blocks described may be changed, eliminated, or combined.

As mentioned above, the example processes of FIGS. 6-10 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably. Additionally or alternatively, the example processes of FIG. 6-10 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

Figure 6:
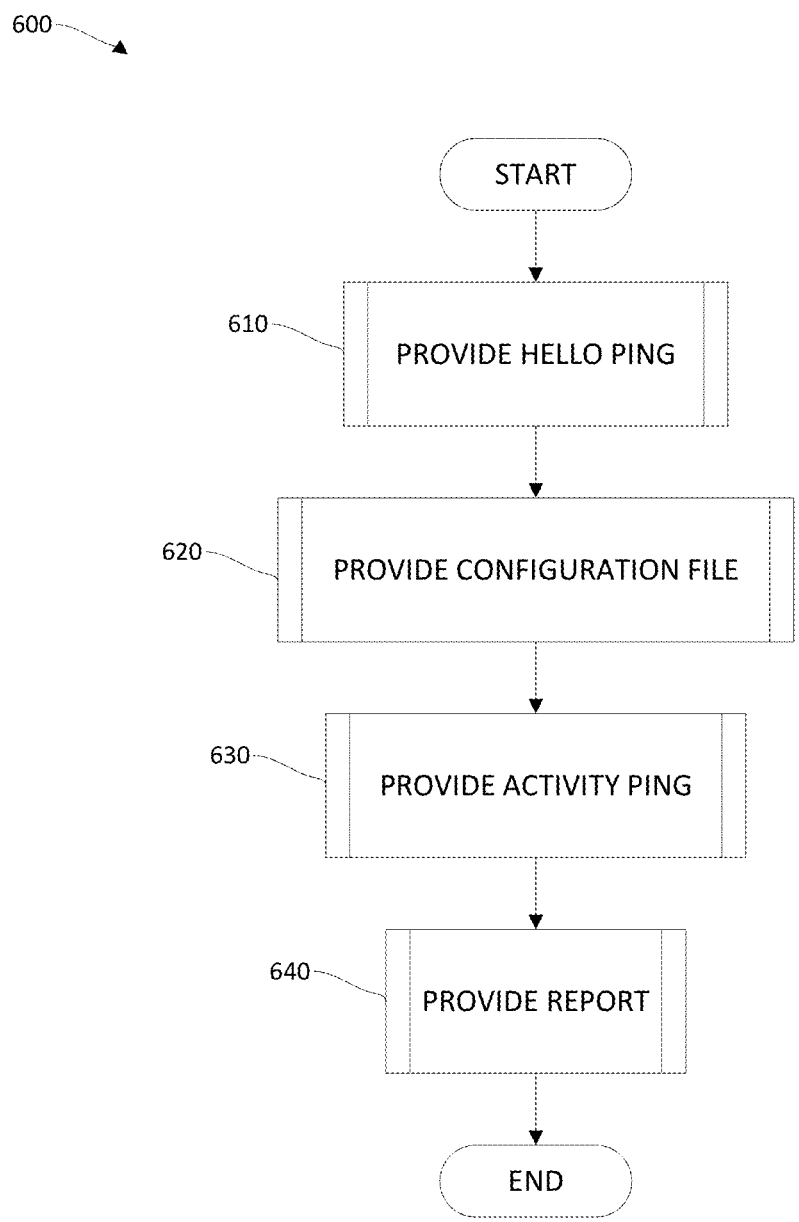
FIG. 6 is a flowchart representative of example machine readable instructions which may be executed to implement the system of FIG. 2.

FIG. 6 is a flowchart representative of example machine readable instructions 600 which may be executed to implement the system 210 of FIGS. 2 and 5 to add location and time offset data to digital audio media reporting data. The example instructions 600 may be performed, for example, to produce and send an activity ping that includes media data, a local timestamp, metro data, and time offset data.

The example media player 212 of FIGS. 2 and 5 provides a hello ping (block 610). The example characterizer 214 of FIGS. 2 and 5 provides a configuration file based on the hello ping to the media player 212 (block 620). The media player 212 provides an activity ping based on the configuration file to the example data proprietor 216 of FIG. 2 (block 630). The data proprietor 216 provides a report based on the activity ping (block 640).

Figure 7:
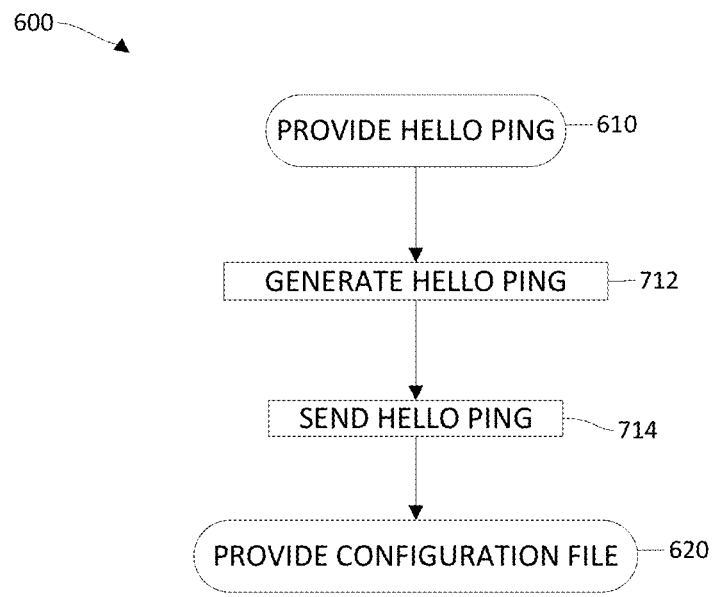
FIG. 7 is a flowchart representative of example machine readable instructions which may be executed to implement a hello ping generator of a media player of the system of FIG. 2.

FIG. 7 is a flowchart representative of example machine readable instructions for implementing processing at block 610 of the example program 600 of FIG. 6. In the example of FIG. 7, to provide a hello ping, the example hello ping generator 213 of the media player 212 generates the hello ping (block 712). In some examples, the example hello ping generator 213 of the media player 212 generates the hello ping to include a location identifier. In some examples, the location identifier may be at least one of global positioning coordinates or an internet protocol address. In some examples, the hello ping generator 213 of the media player 212 generates the hello ping to include a local timestamp and media data. The hello ping generator 213 of the media player 212 then sends the generated hello ping to the characterizer 214 of FIGS. 2 and 5 via the network 217 (block 714).

Figure 8:
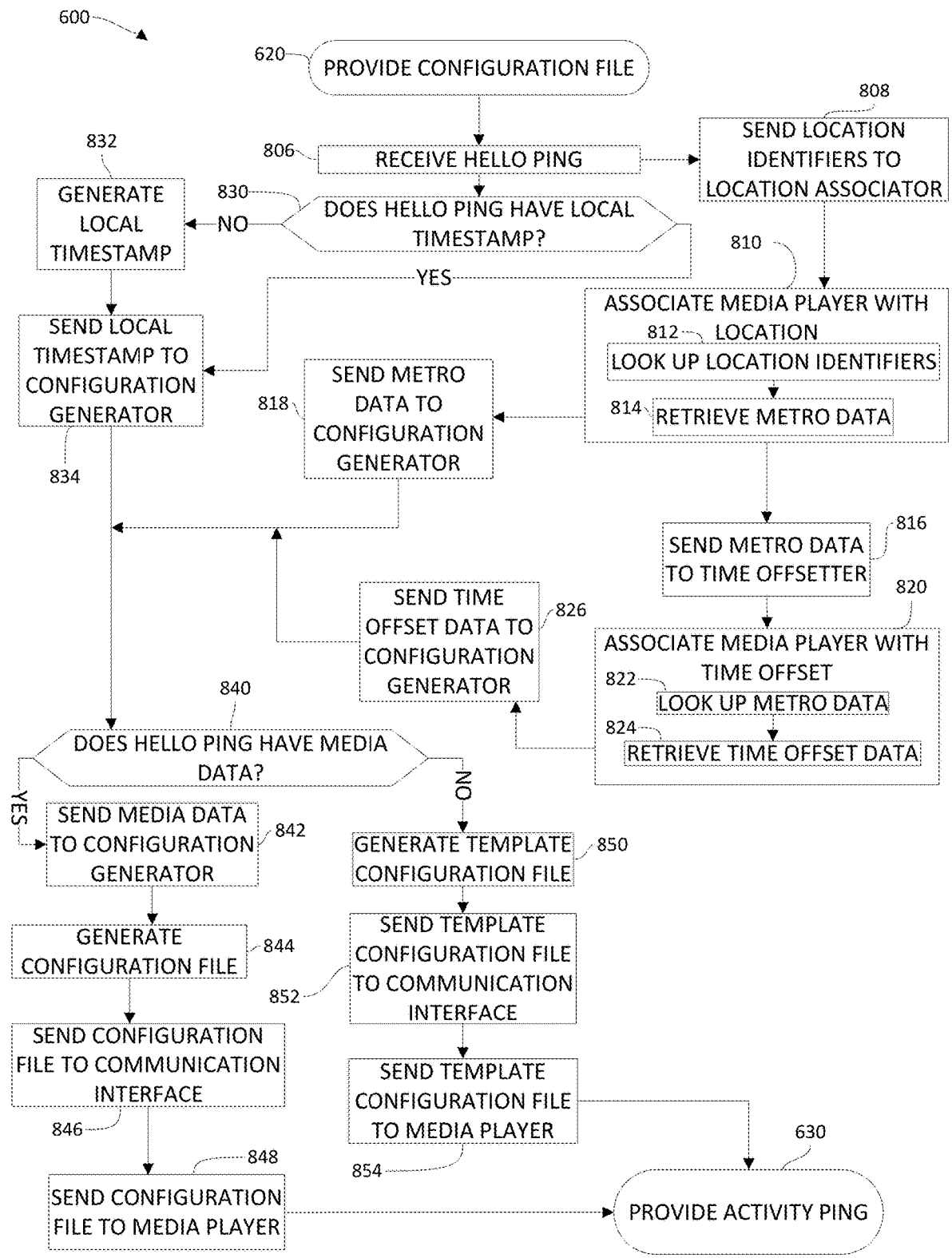
FIG. 8 is a flowchart representative of example machine readable instructions which may be executed to implement a characterizer of the system of FIG. 2.

FIG. 8 is a flowchart representative of example machine readable instructions for implementing processing at block 620 of the example program 600 of FIG. 6. In the example of FIG. 8, to provide a configuration file, the example communication interface 512 of FIG. 5 of the example characterizer 214 receives the hello ping from the hello ping generator 213 of the media player 212 (block 806). The communication interface 512 then sends the location identifier to the example location associator 514 of FIG. 5 (block 808).

The location associator 514 uses the location identifier to associate the media player 212 with a location (block 810) by looking up the location identifier in the example location database 308 of FIGS. 3 and 5 included in the characteristic database 516 of FIG. 5 (subblock 812) and retrieving location-descriptive metro data respective to the location identifier from the location database 308 (subblock 814). In some examples, the metro data may include postal codes and first and second metro identifiers. In some examples, the location associator 514 sends the metro data to the example time offsetter of FIG. 5 (block 816). In some examples, the example location associator sends the metro data to the example configuration generator 520 of FIG. 5. (block 818).

The time offsetter 518 uses the metro data, specifically the first and second metro identifiers, to associate the media player 212 with time offset data (block 820) by looking up the metro data in the example time database 408 of FIGS. 4 and 5 included in the characteristic database 516 (subblock 822) and retrieving the time offset data from the example time database 408 (subblock 824). In some examples, the time offset data may include a Greenwich Mean Time offset, a day start offset, a week start offset, and a daylight offset. The time offsetter 518 then sends the time offset data to the configuration generator 520 (block 826).

Looking back, after receiving the hello ping (block 806), the communication interface 512 further determines whether the hello ping includes a local timestamp (block 830). If the hello ping does not include the local timestamp, the communication interface 512 generates the local timestamp (block 832) and sends the generated local timestamp to the configuration generator 520 (block 834). In some examples, the communication interface 512 bases the local timestamp on when the hello ping was received. If the hello ping does include a local timestamp, the communication interface 512 sends the local timestamp to the configuration generator 520 (block 834).

The communication interface 512 further determines whether the hello ping includes media data (block 840). If the hello ping does include media data, the communication interface 512 sends the media data to the configuration generator 520 (block 842). The configuration generator 520 then, based on the local timestamp, generates a daypart identification, a week identification, and a reporting period identification 120 to combine with the local timestamp, the metro data, the time offset data, and the media data to generate a configuration file (block 844). The configuration generator 520 then sends the configuration file to the communication interface 512 (block 846). The communication interface 512 then in turn sends the configuration file to the media player 212 via the network 217 (block 848).

If, however, the communication interface 512 determines that the hello ping does not include media data, the configuration generator 520, based on the local timestamp, generates a daypart identification, a week identification, and a reporting period identification to combine with the local timestamp, the metro data, and the time offset data to generate a template configuration file (block 850). The configuration generator 520 then sends the template configuration file to the communication interface 512 (block 852). The communication interface 512 in turn sends the template configuration file to the media player 212 via the network 217 (block 854).

Figure 9:
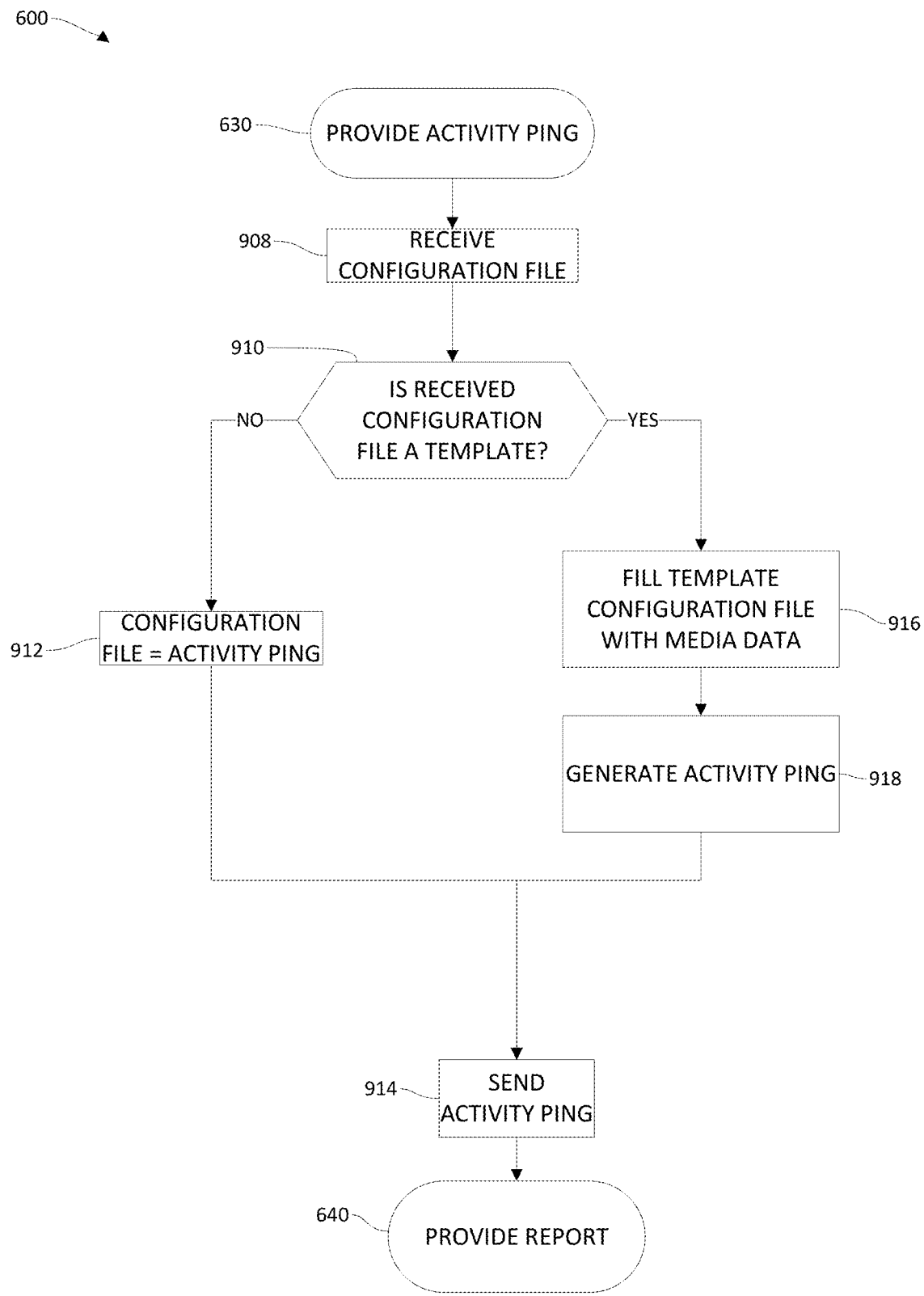
FIG. 9 is a flowchart representative of example machine readable instructions which may be executed to implement an activity ping generator of the media player of the system of FIG. 2.

FIG. 9 is a flowchart representative of example machine readable instructions for implementing processing at block 630 of the example program 600 of FIG. 6. In the example of FIG. 9, to provide an activity ping, the example activity ping generator 239 of the media player 212 receives the configuration file from the communication interface 512 (block 908). The activity ping generator 239 determines whether the configuration file is a template (block 910). If the configuration file is not a template, the activity ping generator 239 recognizes the configuration file as delivered as the activity ping (block 912). The activity ping generator 239 then sends the activity ping to the data proprietor 216 via the network 217 (block 914).

If the configuration file is a template, the activity ping generator 239 fills the template configuration file with media data (block 916). The activity ping generator 239 then generates an activity ping based on the filled template configuration file (block 918). The activity ping generator 239 then sends the activity ping to the media proprietor 216 via the network 217 (block 914).

Figure 10:
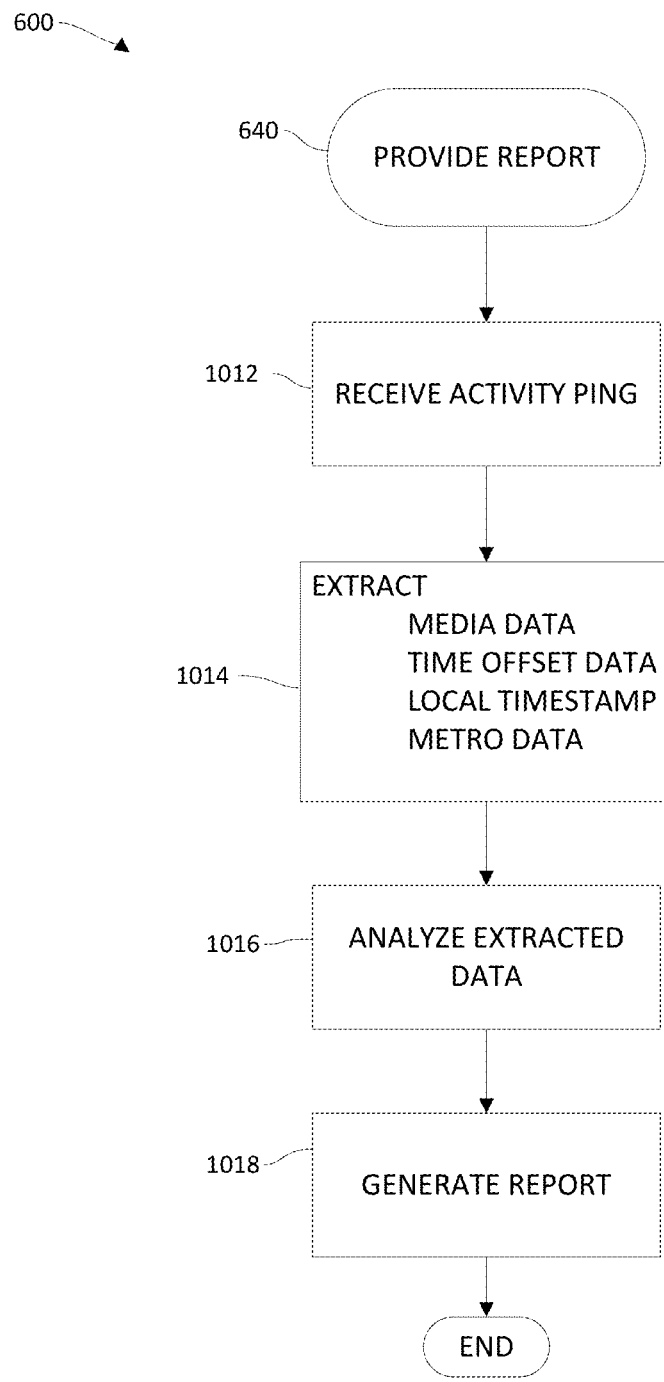
FIG. 10 is a flowchart representative of example machine readable instructions which may be executed to implement a data proprietor of the system of FIG. 2.

FIG. 10 is a flowchart representative of example machine readable instructions for implementing processing at block 640 of the example program 600 of FIG. 6. In the example of FIG. 10, to provide a report, the example activity ping processor 242 of the data proprietor 216 receives the activity ping (block 1012). The activity processor 242 then extracts the media data, the time offset data, the local timestamp, and the metro data from the received activity ping (block 1014). The activity processor 242 then analyzes the extracted data (block 1016). In some examples, the activity processor 242 analyzes data extracted from multiple activity pings from multiple media player 212 users. The activity processor 242 then generates a report based on the analysis (block 1018). The program 600 then ends.

Figure 11:
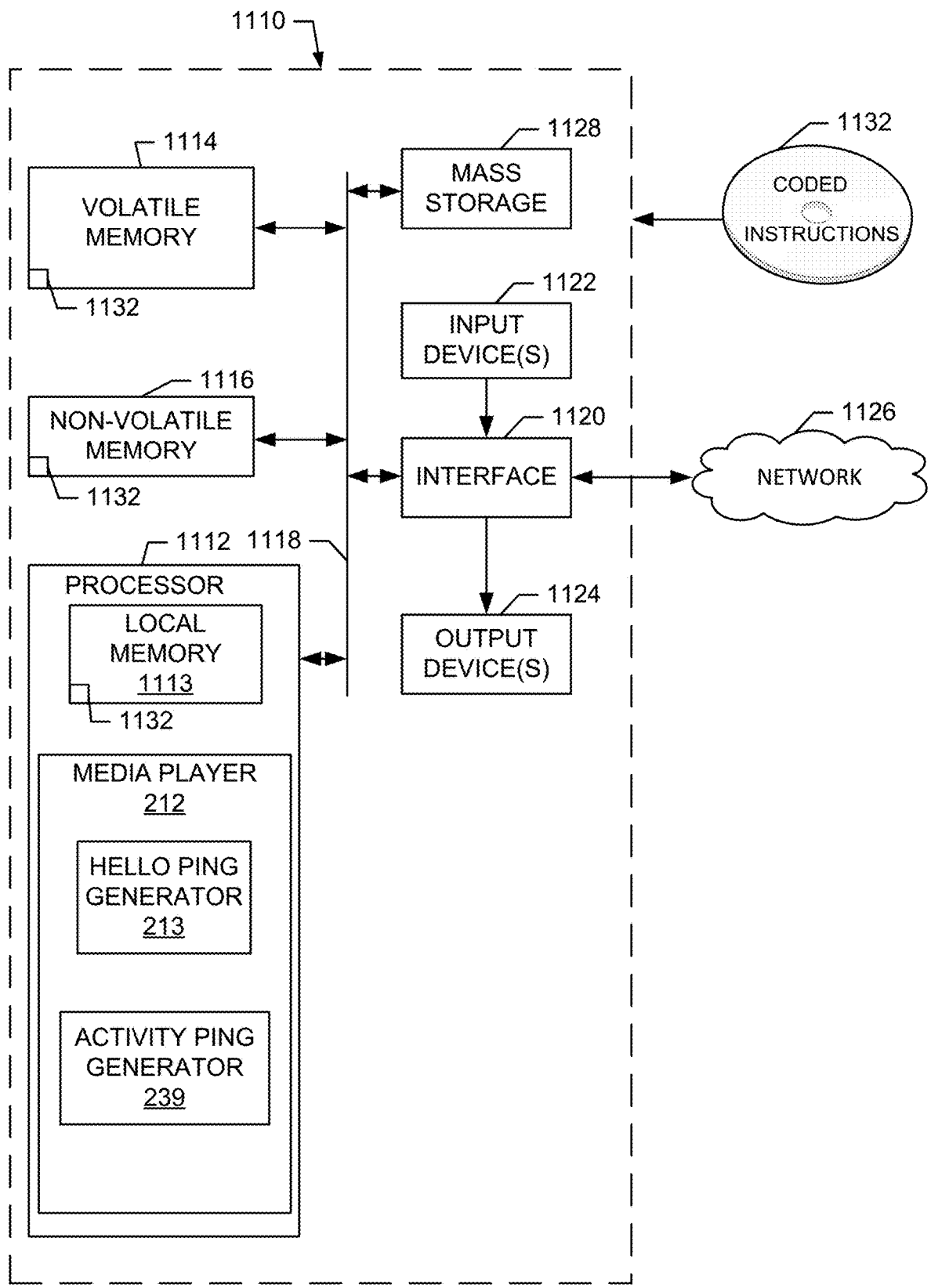
FIG. 11 is a block diagram of an example computer capable of executing the instructions of FIGS. 7 and 9 to implement the media player of FIGS. 2 and 5.

FIG. 11 is a block diagram of an example processor platform 1110 structured to execute the instructions of FIGS. 7 and 9 to implement the media player 212 of the system 210 of FIGS. 2 and 5. The processor platform 1110 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1110 of the illustrated example includes a processor 1112. The processor 1112 of the illustrated example is hardware. For example, the processor 1112 can be implemented by one or more integrated circuits, logic circuits, microprocessors or controllers from any desired family or manufacturer. In the illustrated example, the processor 1112 is structured to include the example media player 212, which includes the example hello ping generator 213 and the example activity ping generator 239.

The processor 1112 of the illustrated example includes a local memory 1113 (e.g., a cache). The processor 1112 of the illustrated example is in communication with a main memory including a volatile memory 1114 and a non-volatile memory 1116 via a bus 1118. The volatile memory 1114 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1116 may be implemented by flash memory and/or any other desired type of memory device. Access to the main memory 1114, 1116 is controlled by a memory controller.

The processor platform 1110 of the illustrated example also includes an interface circuit 1120. The interface circuit 1120 may be implemented by any type of interface standard, such as an Ethernet interface, a universal serial bus (USB), and/or a PCI express interface.

In the illustrated example, one or more input devices 1122 are connected to the interface circuit 1120. The input device(s) 1122 permit(s) a user to enter data and commands into the processor 1112. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1124 are also connected to the interface circuit 1120 of the illustrated example. The output devices 1124 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1120 of the illustrated example, thus, typically includes a graphics driver card, a graphics driver chip or a graphics driver processor.

The interface circuit 1120 of the illustrated example also includes a communication device such as a transmitter, a receiver, a transceiver, a modem and/or network interface card to facilitate exchange of data with external machines (e.g., computing devices of any kind) via a network 1126 (e.g., an Ethernet connection, a digital subscriber line (DSL), a telephone line, coaxial cable, a cellular telephone system, etc.).

The processor platform 1110 of the illustrated example also includes one or more mass storage devices 1128 for storing software and/or data. Examples of such mass storage devices 1128 include floppy disk drives, hard drive disks, compact disk drives, Blu-ray disk drives, RAID systems, and digital versatile disk (DVD) drives.

The coded instructions 1132 of FIGS. 7 and 9 may be stored in the mass storage device 1128, in the volatile memory 1114, in the non-volatile memory 1116, and/or on a removable tangible computer readable storage medium such as a CD or DVD.

Figure 12:
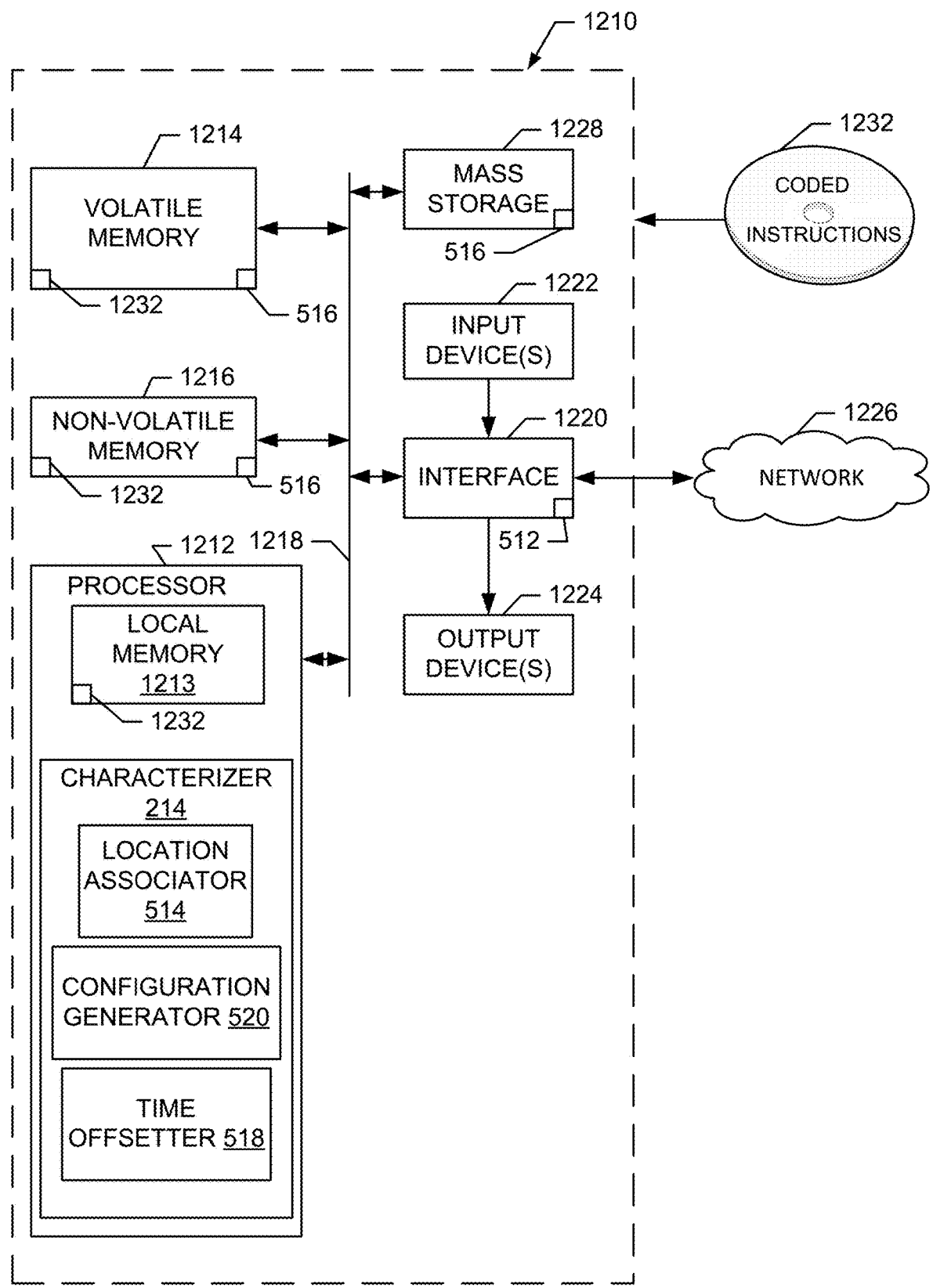
FIG. 12 is a block diagram of an example computer capable of executing the instructions of FIG. 8 to implement the characterizer of FIGS. 2 and 5.

FIG. 12 is a block diagram of an example processor platform 1210 structured to execute the instructions of FIG. 8 to implement the characterizer 214 of the system 210 of FIGS. 2 and 5. The processor platform 1210 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1210 of the illustrated example includes a processor 1212. The processor 1212 of the illustrated example is hardware. For example, the processor 1212 can be implemented by one or more integrated circuits, logic circuits, microprocessors or controllers from any desired family or manufacturer. In the illustrated example, the processor 1212 is structured to include the example characterizer 214, which includes the example location associator 514, the example time offsetter 518, and the example configuration generator 520.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1216 may be implemented by flash memory and/or any other desired type of memory device. Access to the main memory 1214, 1216 is controlled by a memory controller.

The processor platform 1210 of the illustrated example also includes an interface circuit 1220. The interface circuit 1220 may include the example communication interface 512 of FIG. 5. The interface circuit 1220 may be implemented by any type of interface standard, such as an Ethernet interface, a universal serial bus (USB), and/or a PCI express interface.

In the illustrated example, one or more input devices 1222 are connected to the interface circuit 1220. The input device(s) 1222 permit(s) a user to enter data and commands into the processor 1212. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1220 of the illustrated example, thus, typically includes a graphics driver card, a graphics driver chip or a graphics driver processor.

The interface circuit 1220 of the illustrated example also includes a communication device such as a transmitter, a receiver, a transceiver, a modem and/or network interface card to facilitate exchange of data with external machines (e.g., computing devices of any kind) via a network 1226 (e.g., an Ethernet connection, a digital subscriber line (DSL), a telephone line, coaxial cable, a cellular telephone system, etc.).

The processor platform 1210 of the illustrated example also includes one or more mass storage devices 1228 for storing software and/or data. Examples of such mass storage devices 1228 include floppy disk drives, hard drive disks, compact disk drives, Blu-ray disk drives, RAID systems, and digital versatile disk (DVD) drives.

The coded instructions 1232 of FIG. 8 and the example characteristic database 516 of FIG. 5 may be stored in the mass storage device 1228, in the volatile memory 1214, in the non-volatile memory 1216, and/or on a removable tangible computer readable storage medium such as a CD or DVD.

Figure 13:
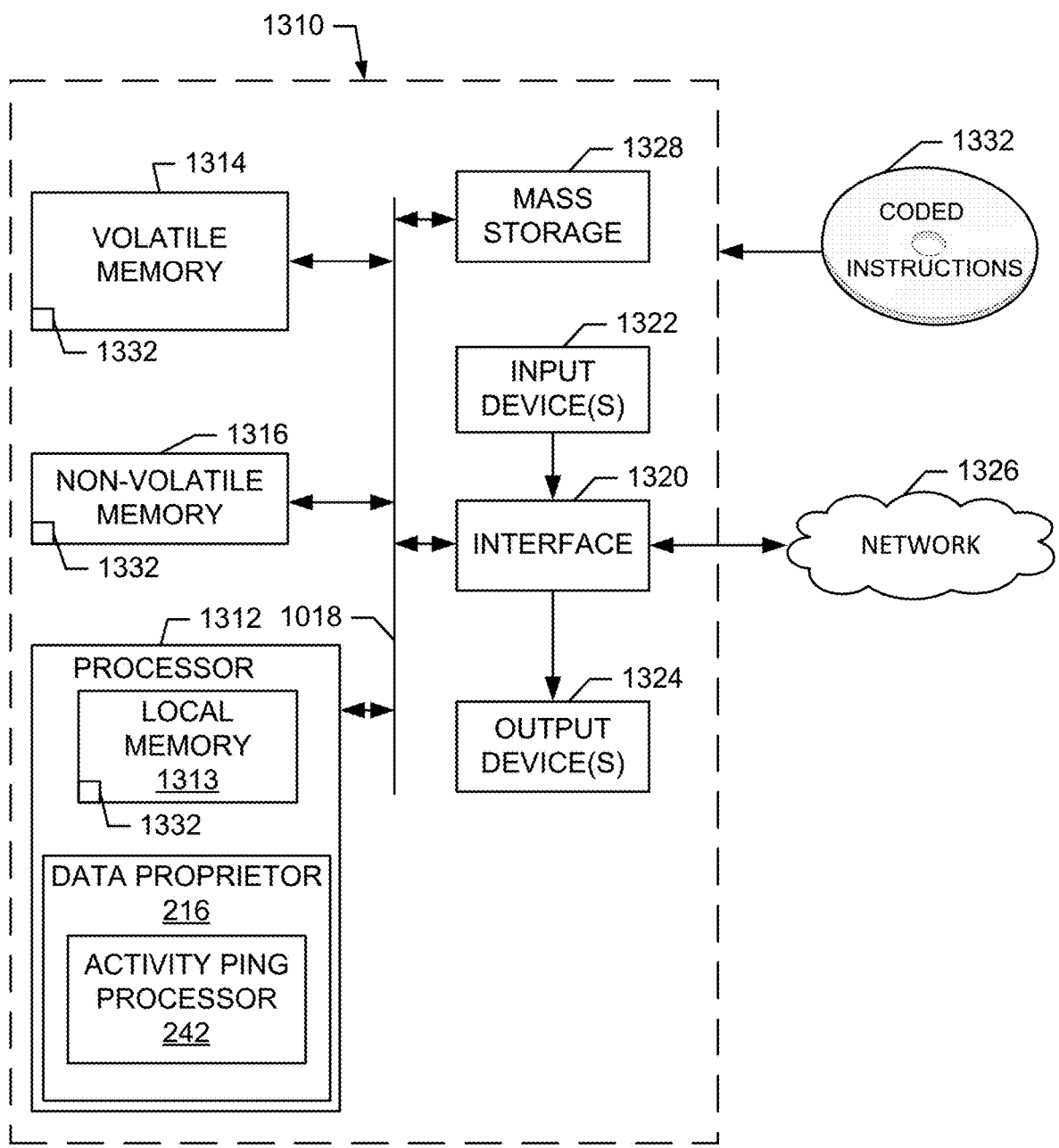
FIG. 13 is a block diagram of an example computer capable of executing the instructions of FIG. 10 to implement the data proprietor of FIGS. 2 and 5.

FIG. 13 is a block diagram of an example processor platform 1110 structured to execute the instructions of FIG. 10 to implement the data proprietor 216 of the system 210 of FIGS. 2 and 5. The processor platform 1310 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 1310 of the illustrated example includes a processor 1312. The processor 1312 of the illustrated example is hardware. For example, the processor 1312 can be implemented by one or more integrated circuits, logic circuits, microprocessors or controllers from any desired family or manufacturer. In the illustrated example, the processor 1312 is structured to include the example data proprietor 216, which includes the example activity ping processor 242.

The processor 1312 of the illustrated example includes a local memory 1313 (e.g., a cache). The processor 1312 of the illustrated example is in communication with a main memory including a volatile memory 1314 and a non-volatile memory 1316 via a bus 1318. The volatile memory 1314 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1316 may be implemented by flash memory and/or any other desired type of memory device. Access to the main memory 1314, 1316 is controlled by a memory controller.

The processor platform 1310 of the illustrated example also includes an interface circuit 1320. The interface circuit 1320 may be implemented by any type of interface standard, such as an Ethernet interface, a universal serial bus (USB), and/or a PCI express interface.

In the illustrated example, one or more input devices 1322 are connected to the interface circuit 1320. The input device(s) 1322 permit(s) a user to enter data and commands into the processor 1312. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1324 are also connected to the interface circuit 1320 of the illustrated example. The output devices 1324 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 1320 of the illustrated example, thus, typically includes a graphics driver card, a graphics driver chip or a graphics driver processor.

The interface circuit 1320 of the illustrated example also includes a communication device such as a transmitter, a receiver, a transceiver, a modem and/or network interface card to facilitate exchange of data with external machines (e.g., computing devices of any kind) via a network 1326 (e.g., an Ethernet connection, a digital subscriber line (DSL), a telephone line, coaxial cable, a cellular telephone system, etc.).

The processor platform 1310 of the illustrated example also includes one or more mass storage devices 1328 for storing software and/or data. Examples of such mass storage devices 1328 include floppy disk drives, hard drive disks, compact disk drives, Blu-ray disk drives, RAID systems, and digital versatile disk (DVD) drives.

The coded instructions 1332 of FIG. 10 may be stored in the mass storage device 1328, in the volatile memory 1314, in the non-volatile memory 1316, and/or on a removable tangible computer readable storage medium such as a CD or DVD.

From the foregoing, it will be appreciated that the example methods, apparatus and articles of manufacture disclosed herein may aid in analyzing, comparing, and understanding how and when digital audio media is consumed on a global scale. By attaching local time data and location data to digital audio media reporting data, the preferences and habits of media consumers spread across different time zones and latitudes may be deduced. Learning about digital audio media consumers' preferences and habits may help digital audio broadcasters to provide music and programs that digital audio media consumers want to hear and to additionally deliver targeted advertisements for products that may interest digital audio media consumers.

It is noted that this patent claims priority from Indian Provisional Patent Application Serial Number 4710/CHE/2015 which is entitled "Methods And Apparatus To Facilitate Local Time-Based Digital Audio Measurement Based On Market Local Measurement For Digital Audio" and was filed on Sep. 5, 2015, and is hereby incorporated by reference in its entirety.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method comprising:
    associating, by executing an instruction with a processor, a media player with a location based on a first report received via a network from the media player, the first report including a media identifier and a player event identifier identifying a command performed by the media player;
    associating, by executing an instruction with the processor, the media player with a time offset value representative of a time difference between a time zone determined for the media player based on the location and a reference time zone;
    generating, by executing an instruction with the processor, a configuration file to send to the media player, the configuration file including the location and the time offset value, the configuration file including the media identifier and the player event identifier from the first report received from the media player; and
    sending the configuration file to the media player via the network.

2. The method as defined in claim 1, wherein the first report includes at least one of a location identifier, a local timestamp, or a media player identifier.

3. The method as defined in claim 1, further including associating the first report with a local timestamp.

4. The method as defined in claim 3, wherein the first report is associated with the local timestamp after the first report is received.

5. The method as defined in claim 1, wherein the associating of the media player with the location includes searching a location database using a location identifier included in the first report to retrieve the location.

6. The method as defined in claim 5, wherein the location database is to map postal codes to metro regions.

7. The method as defined in claim 6, wherein the location database is to map global positioning data to postal codes.

8. The method as defined in claim 5, wherein the location database is to map global positioning data to metro regions.

9. The method as defined in claim 1, further including populating the configuration file with a media player identifier.

10. The method as defined in claim 1, further including associating at least one of a daylight savings offset, a day start offset, or a week start offset with the media player based on the location.

11. The method as defined in claim 1, wherein the associating of the media player with the time offset value includes searching a time offset database using the location to retrieve the time offset value.

12. The method as defined in claim 1, further including:
    generating a second report based on the configuration file; and
    sending the second report to a data proprietor.

13. An apparatus comprising:
    a location associator to associate a media player with a location based on a first report received via a network from the media player, the first report to include a media identifier and a player event identifier to identify a command performed by the media player;
    a time offsetter to associate the media player with a time offset value representative of a time difference between a time zone determined for the media player based on the location and a reference time zone;
    a configuration file generator to generate a configuration file to send to the media player, the configuration file to include the location and the time offset value, the configuration file to include the media identifier and the player event identifier from the first report received from the media player; and
    a communication interface to send the configuration file to the media player via the network.

14. The apparatus as defined in claim 13, wherein the first report includes at least one of a location identifier, a local timestamp, or a media player identifier.

15. The apparatus as defined in claim 13, wherein the time offsetter is further to associate a local timestamp with the first report corresponding to when the first report is received.

16. The apparatus as defined in claim 13, wherein the location associator is to associate the media player with the location by searching a location database using a location identifier included in the first report to retrieve the location.

17. The apparatus as defined in claim 16, wherein the location database is to map postal codes to metro regions.

18. The apparatus as defined in claim 17, wherein the location database is to map global positioning coordinates to postal codes.

19. The apparatus as defined in claim 16, wherein the location database is to map global positioning coordinates to metro regions.

20. The apparatus as defined in claim 13, wherein the time offsetter is to associate the media player with the time offset value by searching a time offset database using the location to retrieve the time offset value.

21. The apparatus as defined in claim 13, wherein the time offsetter is further to associate the media player with at least one of a daylight savings offset, a day start offset, or a week start offset based on the location.

22. A tangible computer readable storage medium comprising computer readable instructions which, when executed, cause a processor to at least:

associate a media player with a location based on a first report received via a network from the media player, the first report to include a media identifier and a player event identifier to identify a command performed by the media player;

associate the media player with a time offset value representative of a time difference between a time zone determined for the media player based on the location and a reference time zone;

generate a configuration file to send to the media player, the configuration file including the location and the time offset value, the configuration file including the media identifier and the player event identifier from the first report received from the media player; and send the configuration file to the media player via the network.

23. The computer readable storage medium as defined in claim 22, wherein the first report includes at least one of a location identifier, a local timestamp, or a media player identifier.

24. The computer readable storage medium as defined in claim 22, wherein the instructions further cause the processor to associate the first report with a local timestamp.

25. The computer readable storage medium as defined in claim 24, wherein the instructions cause the processor to associate the first report with the local timestamp after the first report is received.

26. The computer readable storage medium as defined in claim 22, wherein the instructions cause the processor to associate the media player with the location by searching a location database using a location identifier included in the first report to retrieve the location.

27. The computer readable storage medium as defined in claim 26, wherein the location database is to map postal codes to metro regions.

28. The computer readable storage medium as defined in claim 27, wherein the location database is to map global positioning coordinates to postal codes.

29. The computer readable storage medium as defined in claim 26, wherein the location database is to map global positioning coordinates to metro regions.

30. The computer readable storage medium as defined in claim 22, wherein the instructions further cause the processor to populate the configuration file with at least one of a media player identifier, a media identifier, or a player event identifier.

31. The computer readable storage medium as defined in claim 22, wherein the instructions further cause the processor to associate the media player with at least one of a daylight savings offset, a day start offset, or a week start offset based on the location.

32. The computer readable storage medium as defined in claim 22, wherein the instructions cause the processor to associate the media player with the time offset value by searching a time offset database using the location to retrieve the time offset value.

33. The computer readable storage medium as defined in claim 22, wherein the instructions further cause the processor to:

generate a second report based on the configuration file; and send the second report to a data proprietor.

* * * * *